(12) United States Patent
Khan et al.

(10) Patent No.: US 7,117,370 B2
(45) Date of Patent: Oct. 3, 2006

(54) SYSTEM FOR TRANSMITTING SECURE DATA BETWEEN A SENDER AND A RECIPIENT OVER A COMPUTER NETWORK USING A VIRTUAL ENVELOPE AND METHOD FOR USING THE SAME

(76) Inventors: Sal Khan, 6546 Princiotta St, Greely, Ontario (CA) K1A 0R6; Martin Levine, 19 Church Hill Avenue, Westmount, Quebec (CA) H3Y 2Z8

( * ) Notice: Subject to any disclaimer, the term of this patent is extended or adjusted under 35 U.S.C. 154(b) by 812 days.

(21) Appl. No.: 10/077,864

(22) Filed: Feb. 20, 2002

(65) Prior Publication Data
US 2002/0116508 A1    Aug. 22, 2002

Related U.S. Application Data

(60) Provisional application No. 60/269,393, filed on Feb. 20, 2001.

(51) Int. Cl.
*G06K 9/00* (2006.01)
(52) U.S. Cl. .................. 713/186; 713/170; 713/150
(58) Field of Classification Search .............. 726/28; 713/186, 170, 150
See application file for complete search history.

(56) References Cited

U.S. PATENT DOCUMENTS

| | | | | |
|---|---|---|---|---|
| 5,613,012 | A * | 3/1997 | Hoffman et al. | 382/115 |
| 6,256,737 | B1 * | 7/2001 | Bianco et al. | 713/186 |
| 6,779,178 | B1 * | 8/2004 | Lloyd et al. | 717/174 |

OTHER PUBLICATIONS

Stein J Ryan, PhD, The Who is It? biometric security system, Feb. 18, 1999, QVoice Biometrics, at wwww.qvtrek.com.*

* cited by examiner

*Primary Examiner*—Jacques H. Louis-Jacques
*Assistant Examiner*—Ellen C Tran
(74) *Attorney, Agent, or Firm*—J. Gordon Thomson

(57) ABSTRACT

A method for secure transmission of data, like e-mail and other secure documents, over a computer network includes the use of biometrics to verify that the sender of the data is confirmed as an individual authorized for secure access transmission of data over the network and by verifying that the recipient of the data is also an individual authorized to receive data by secure access transmission over the network. The methodology comprises creating a database containing the biometric templates of all individuals authorized for secure access transmission of data over the network and connecting the database to a data processor. The transmission of counterfeit messages is prevented by confirming the identity of the sender as an individual authorized for secure access transmission over the network by scanning a predetermined biometric of the sender, and comparing the biometric of the sender with the predetermined biometric of all individuals who are authorized for secure access transmission over the network. The recipient of a secure access message is not permitted to access the message until recipient's identity has been similarly confirmed as an individual authorized to receive messages secure access transmitted over the network. Once the recipient's identity is confirmed the message may be opened. The sender will receive confirmation by return electronic mail that the message has been opened by the authorized recipient.

22 Claims, 22 Drawing Sheets

SYSTEM FOR TRANSMITTING SECURE DATA BETWEEN A SENDER AND A RECIPIENT OVER A COMPUTER NETWORK USING A VIRTUAL ENVELOPE AND METHOD FOR USING THE SAME

CROSS REFERENCE TO RELATED APPLICATIONS

This application is entitled to the benefit of Provisional Patent Application 60/269,393 filed on Feb. 20, 2001.

BACKGROUND

1. Field of the Invention

This invention relates to a method for securing the transmission of data over an electronic network, and more particularly, to a method employing biometrics to confirm the identity of individuals transmitting data over an electronic network thereby ensuring the confidentiality and integrity of messages and documents transmitted.

2. Description of the Prior Art

The use of the World Wide Web, local area networks and wide area networks to transmit electronic messages from one computer to another computer is well known. Many organizations and individuals use electronic mail applications such as Microsoft™ Outlook™ to send electronic mail (e-mail) from one location to another. While these applications may have internal security measures embedded within them, they cannot always provide the adequate level of security necessary to transmit sensitive information relating to corporate activities over such networks. It is well known that the security and integrity of information sent over electronic messaging systems can be corrupted through unauthorized interception and modification of such information. As well, in a corporate environment, there may be hundreds of computers electronically joined in a single networked system. Often, these computers are openly available to any user to access the networked system. Where passwords are used to restrict access to authorized personnel, such passwords can be stolen or decrypted. Therefore, the opportunity for insecure and unauthorized access to a networked system exists and under such circumstances the risk of mischief is high. It is well known that significant damage and loss of competitive advantage can result from unauthorized use of corporate computers, interception of sensitive corporate information and premeditated corruption of sensitive information. Present e-mail applications fall short of providing the required degree of security for the transmission of sensitive corporate information over a computer network.

Therefore there is a requirement for effective control of access to computer networks, authentication of users of computer networks and secure transmission of sensitive information over computer networks. There is also a requirement to provide security measures that are simple to use and are compatible with commercially available e-mail applications.

U.S. Pat. No. 5,958,005 issued to Thorne et al. on Sep. 28, 1999 entitled "Electronic Mail Security" teaches a method, system and product for communicating data text messages, such as E-Mail, between computers connected to a network while providing selectable degrees of security for each message. The methodology comprises the procedure of creating in the originating computer a data message having a header which specifies, in addition to the address of the intended recipient computer, one or more security parameters which control the processing of the data message in the recipient computer. The security parameters include instructions for erasure of the data message following its storage in the recipient computer. The security parameters also include instructions as to whether or not copying, archiving, forwarding and printing of the data message is permitted. The recipient computer processes the data message in accordance with the instructions. The erasure is of such a nature as to render the data message irretrievable. However, Thorne does not include methods for authenticating the identification of the sender or the recipient and restricting the access to confidential messages only to authenticated users.

U.S. Pat. No. 6,119,231 issued to Foss, et al. on Sep. 12, 2000 for a "Data scanning network security technique" discloses a system and method for providing enhanced computer network security by scanning data, specifically electronic mail messages, sent to the network before the data is received and transmitted by the network's mail server. An e-mail message is received by a computer network configured to receive data and is checked as the data is received and before it is transmitted to a node on the computer network. The method includes determining whether an external source is attempting to establish a mail connection with the computer network configured to include a data-scanning device that recognizes one or more data transfer protocols. Once the data is received the data-scanning device begins evaluating the data by first determining whether the data is formatted according to one of the recognized protocols. The data-scanning device begins scanning the data for acceptable content and format according to a rule set established by one of the recognized protocols. This is done at the same time as the data-scanning device receives the data. It is then determined whether the data should be sent to its destination on the computer network. If necessary, the data is translated before being passed to its destination on the computer network. Foss does not address the issues of unauthorized use of computer networks or the authentication of network users.

Therefore, insofar as we are aware, no formerly developed method of electronic mail security provides for the necessary degree of authentication of network system users, authentication of senders and recipients of electronic documents and controlled access to confidential documents sent over electronic networks.

SUMMARY

Our invention is a method for creating a secure access transmission mode for the sending and receipt of data over a computer network using biometrics. Our method comprises steps of: creating a database adapted to store a plurality of predetermined biometric templates of individuals authorized for secure access transmission over said network; populating the database with said predetermined biometric templates of individuals authorized for secure access transmission over the network; providing biometric capture means to capture the predetermined biometric of an individual seeking authority for secure access transmission over the network; providing a data processing unit and connecting the biometric capture means and the database to said unit; and, providing a first means executable by the unit and adapted to receive from said biometric capture means the predetermined biometric of individuals seeking authority for secure access transmission over the network, converting the predetermined biometric to biometric templates and comparing the captured predetermined biometric templates with the previously obtained and predetermined biometric templates of individuals who are authorized for secure access transmission over the network said templates stored on the database so that the identity of the individual seeking to use secure access transmission may be confirmed as an individual authorized for secure access transmission; providing a second means executable by the unit and adapted to cooperate with said first means so that secure access transmission over the network is permitted when first means confirms the identity of the individual and so that secure access transmission over the network is denied when first means is unable to confirm the identity of the individual so that in the secure access transmission mode no data may be sent between two computers on a network without the prior biometric authentication of the sender and recipient of the data.

The identity authentication may use one or a combination of any human biometrics such as face biometrics, iris recognition, fingerprint recognition or voice recognition. Our invention can be used with commercially available electronic messaging systems one example of which is Microsoft™ Outlook™ and which shall be used to illustrate the operation and innovative features our invention in this document.

Our invention provides for a number of modes of transmission of messages over a network. A first mode is an insecure access mode to be used for routine and insecure message transmission over the network using the normal features of the e-mail application. No further identification of the user is necessary other than the routine logon protocols established by the network. A second mode is the secure access transmission mode for the transmission of sensitive information. In the secure access transmission mode, the identity of the sender and the recipient must be authenticated using one or more human biometrics prior to permitting the user to transmit or receive messages over the network. A third mode of transmission is the secure access encrypted transmission mode wherein public key encryption is added to provide a higher level of security to the message.

Optionally, means to track and log secure documents transmitted over the network is provided.

To illustrate the secure access transmission mode of our invention and other features of our invention, the use of human facial biometrics will be discussed. However, it is to be understood that other suitable human biometrics and their related technologies, such as the iris, fingerprint, handprint or voice, may be used to obtain a secure access transmission mode.

To create a secure access transmission mode using the human facial biometric, each networked computer is equipped with a camera for scanning the user's face and a first software application for converting scanned facial images into biometric templates. The first software application compares the scanned image of the face of the person seeking to use the secure access transmission mode with the pre-obtained biometric templates of individuals who are authorized to the secure access transmission mode. These pre-obtained templates are stored in a database operably connected to the computer or to a server.

One-way biometric authentication is also available in those situations where, for example, the sender is able to use a secure access transmission mode and the recipient cannot. The use of different biometrics on each of the sender's and recipient's computer is also contemplated. For example, the sender may use a fingerprint scanner for identity authentication and the recipient may use a camera for scanning facial images as identity authentication.

In operation, to send a message using the secure access transmission mode of our invention using the human facial biometric for identity authentication, the method of our invention comprises the steps of scanning the face of the sender using a digital camera and using a first software application to create a biometrically accurate template of the sender's facial image. The template may be stored on the sender's computer hard drive or on a network storage device. To permit creation of a secure access transmission mode, the method includes the steps of scanning the face of the sender, using the first software application to create a biometrically accurate image of the user's face, using the first software application to compare that image with the biometric templates of authorized users of the secure access transmission mode stored on the computer or network, and, if there is a match between the sender's biometric template and those templates of authorized users stored on the computer or network, permitting the sender to send messages over the network using the secure access transmission mode. The first software application may be the software IT'S ME by VisionSphere Technologies Inc. The camera may be the IT'S ME camera also by VisionSphere Technologies Inc.

Once the identity of the user is confirmed as an authorized user, the method includes the step of using a second software application to create a virtual electronic envelope and displaying the envelope on the sender's computer monitor. The second software application is preferably the VS MAIL application by VisionSphere Technologies Inc. The message and all attachments are electronically attached to the envelope using the second software application. Once sent, the envelope can only be opened upon biometric verification of the identity of the recipient. The biometrically verified facial image of the sender and the sender's corporate logo are placed on the envelope. The sender's image may include a digital watermark to ensure that it is not counterfeit. The virtual envelope containing the message is then sent to the recipient in a secure access transmission mode using the send command button of the e-mail application.

To open the envelope, the recipient must undergo identity authentication using a biometric, such as the facial biometric, described above. Using the facial biometric, the recipient's face is scanned by the camera, converted to a biometric template using the first software application, compared with biometric templates of authorized users stored on the recipient's computer or network data storage device using the first software application. Once the identity of the recipient is verified, the second software application will permit the recipient to open the envelope and access the message and attachments. To confirm receipt of the message by an authenticated recipient, the enveloped is marked as open and a verified image of the recipient is attached to the envelope. The envelope is then returned to the sender.

Another innovative feature of our invention is its ability to incorporate public key encryption methodologies currently commercially available as well as those being presently developed. The use of an encryption process over the secure access transmission mode creates a higher level of secured transmission that called the secure access encrypted transmission mode. The following discussion is meant to be illustrative of the encryption process used with our invention and it is to be understood that any encryption process can be used to encrypt and decrypt virtual envelope and its contents for transmission over the network.

OBJECTS AND ADVANTAGES OF OUR INVENTION

Accordingly, the advantages and objectives of the invention include the provision of an improved method of securing electronic mail sent over a network; providing a method for verifying the identity of network system users using human biometrics; providing a method for authenticating the identity of the senders and recipients of electronic mail sent over a network using biometrics; and, providing a method to restrict access to confidential information transmitted over a computer network only to those who can be verified as having authority to send or receive secure access transmissions over the network. Another object of our invention is to incorporate presently available and future methods of encryption. Still other advantages and objects will become apparent from a study of the following drawings and description of the operation of the invention.

DETAILED DESCRIPTION

Figure 1:
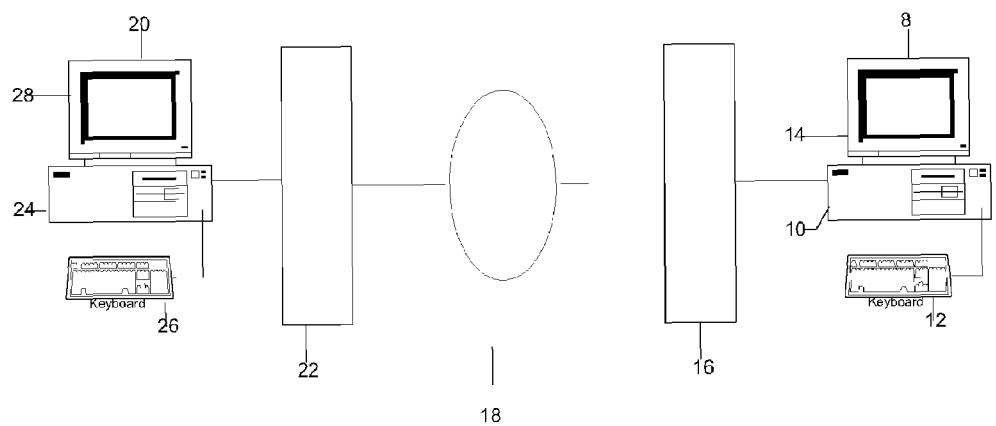
FIG. 1 shows in schematic form a simple computer network.

A simplified computer network is shown in FIG. 1. Such a network might exist between two offices within the same building or in different cities. The network comprises a first station (8) comprising a computer (10) having a keyboard (12) and a monitor (14). The computer (10) is connected to a local server (16) that moderates incoming and outgoing flows of data messages. The server is connected to a network of computers (18). The network could be the World Wide Web (Internet), a local area network (LAN) or a wide area network (WAN). A second station (20) comprising a computer (24), keyboard (26) and monitor (28) are also connected to the network (18) through server (22). In a typical corporate network there may be hundreds of workstations connected to the network (18). Data may be communicated between workstations relatively easily using commercially available electronic mail applications such as Microsoft™ Outlook™. Many other types of applications are available for home or corporate use. Such applications may contain additional encryption security devices or additional encryption security devices may be available from third party providers such as VERISIGN or ENTRUST.

Figure 2:
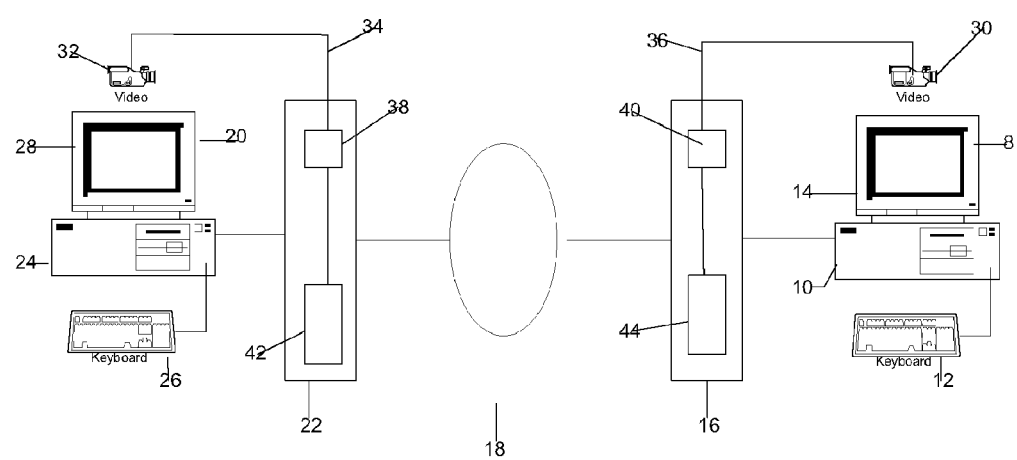
FIG. 2 shows in schematic form a simple computer network using one embodiment of our invention.

Referring to FIG. 2, our invention comprises the addition of certain hardware and software components as well as a methodology for creating a secure access transmission mode by which sensitive data may be transmitted with confidence over a network. Our invention makes use of biometrics. For example, such biometrics may take the form of a fingerprint, a handprint an iris pattern, a voiceprint or a facial pattern. Any suitable biometric may be used. For illustrative purposes we have chosen to describe and exemplify the operation of our invention using facial biometrics. However, it is to be understood that our invention may be applied using different human biometrics or a combination of human biometrics.

The use of facial biometrics is well known to persons skilled in the art and need not be further explained here. To apply biometrics to existing computer networks requires the addition of a digital video cameras (30) and (32) to each of workstations (8) and (20) and any other workstations belonging to the network (18) as desired. The video camera is preferably the IT'S ME™ camera manufactured by Vision Sphere Technologies Inc. The IT'S ME™ camera is capable of obtaining the necessary images of the face of the network user in ambient lighting conditions to allow conversion of the digital image to a biometric template. In another embodiment of our invention, the cameras (30) and (32) may be replaced by fingerprint scanners, iris scanners or some other device to obtain a suitable human biometric for identity authentication that may be available from a third party biometric identification technology supplier. Since the biometric identification process requires comparing scanned biometrics with previously obtained biometrics, a database (42) and (44) suitable for storing a plurality of previously obtained biometrics is also used. The database is connected to the processing unit (38) and (40) In the case of facial biometrics the database will contain the facial biometric templates of individuals who are authorized to use the secure access transmission mode created by our invention. For example, the IT'S ME product by VisionSphere Technologies Inc. would include a database for storing biometric templates created from facial images. If the biometric identification system were using fingerprints, then the system provider would supply its own database suitable for storing a plurality of fingerprint templates for comparison with scanned fingerprints.

Returning to our example of using facial images as the identity verification biometric, the camera is connected (34) and (36) to a central processing unit (38) and (40). In the embodiment of our invention shown in FIG. 2, the central processing unit resides within the server (16) and (22). However, it is to be understood that the central processing unit can be the same unit found in computers (10) and (24). Wherever they reside, the central processing units must be sufficiently powerful to swiftly process the large amount of digital data comprising a video image.

A first software program is provided and resides within the central processing unit or a connected memory device and is adapted to receive data from video cameras (30) and (32) and convert this data into a digital biometric template of the face of the individual user. The digital biometric template contains data unique to the individual whose face has been scanned. The biometric template offers a very confident instrument with which to identify that individual from a group of individuals. The facial recognition and comparison software may be the IT'S ME™ software by Vision Sphere Technologies Inc.

When the facial biometric is used, the database will contain a plurality of biometric templates of individuals who are authorized to use the secure access transmission mode. These individuals have had their faces previously scanned by a digital video camera. Biometric templates have been created of each individual's face and stored within the database (42) and (44). In a corporate environment, it is contemplated that the scanning of the individuals face would take place upon first employment in a human resources office. Then the network administrator would convert the scanned image to a biometric template and store the template in the database. Hundreds of biometric templates may be created and stored on the database representing all members of a corporation-authorized access to the corporate network (18).

One advantage of our invention is that it can be installed on pre-existing networks using commercially available e-mail applications. It is understood that our invention is installed with commercially available e-mail applications and is to be used optionally at the discretion of the sender. As a further example and still referring to FIG. 2, a sender wishing to send an e-mail message may have access to workstation (8). The sender will then access the e-mail application residing on computer (10) or within a server (16). The sender may be able to optionally utilize a secure access transmission mode upon the precondition that the identification of the sender is confirmed as an authorized user of the system using a human biometric. The network may be optionally operated without our invention and data transmission may occur from one computer to another over the network without the need for recipient and sender identification verification using biometrics. This mode is an insecure access transmission mode because any individual may have access to the network having met the logon protocols of the network.

Figure 3:
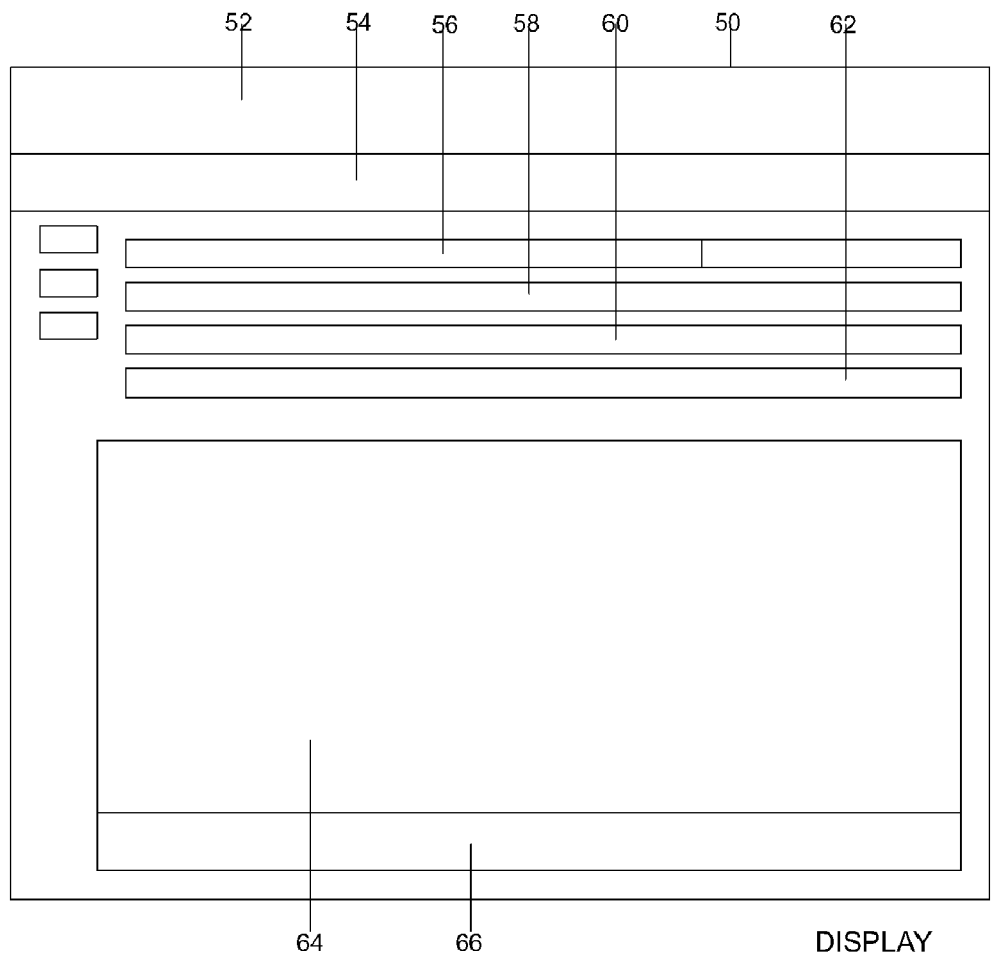
FIG. 3 shows a typical data entry screen for a commercial e-mail application.
Figure 3A:
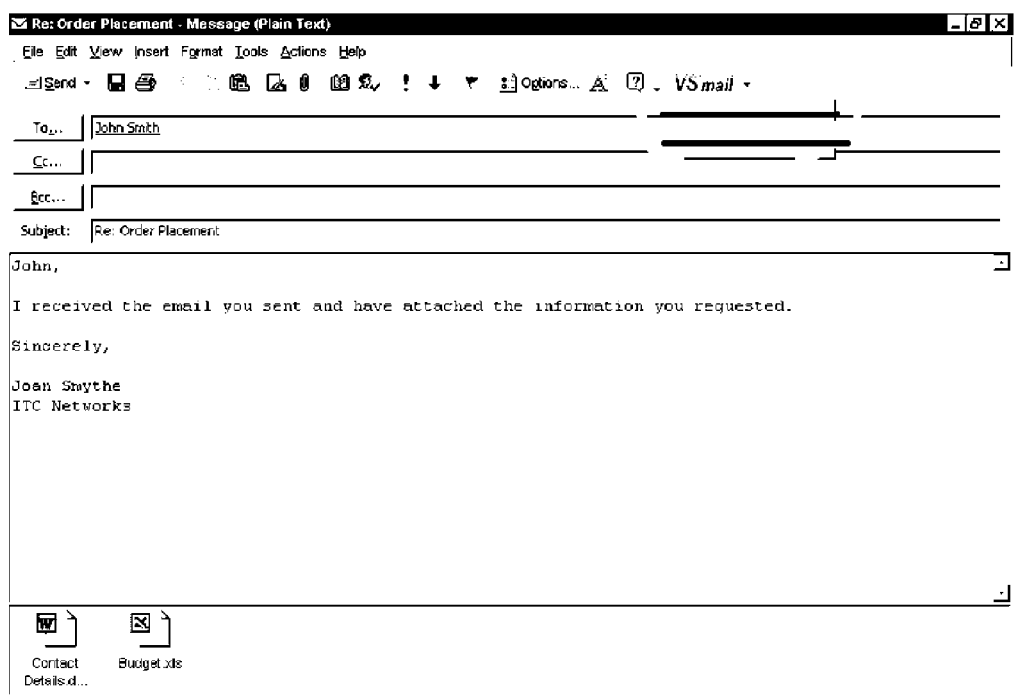
FIG. 3A shows a typical data entry screen for Microsoft™ Outlook™ with the invention icon VSMAIL™ displayed.

Referring to FIG. 3, a typical screen (50) from an e-mail application program is illustrated. Most e-mail applications have similar features such as a header bar (52) containing a line of pull-down menus for filing or editing messages and a header bar (54) containing a line of tool box icons representing various operating tools of the application such as message printing, font size and other related operations. Also typical in an e-mail application is line (56) for placing the name and address of the recipient (TO), a line (58) for the name and address of the sender (FROM), a line (60) for copy recipients and a subject line (62). The message is composed within text box (64) and a footer line (66) is available for attachments that may be electronically attached to the message. Of course, many other features are available in e-mail applications such as scroll bars but do not need to be illustrated here to show the operation of our invention. Referring to FIG. 3A there is shown an actual example of a Microsoft™ Outlook™ data entry screen with a text message and attachments showing the icon of our invention indicated by its trademark VSMAL™ and confirming that our invention is operably available to the network user desiring secure access.

Figure 4:
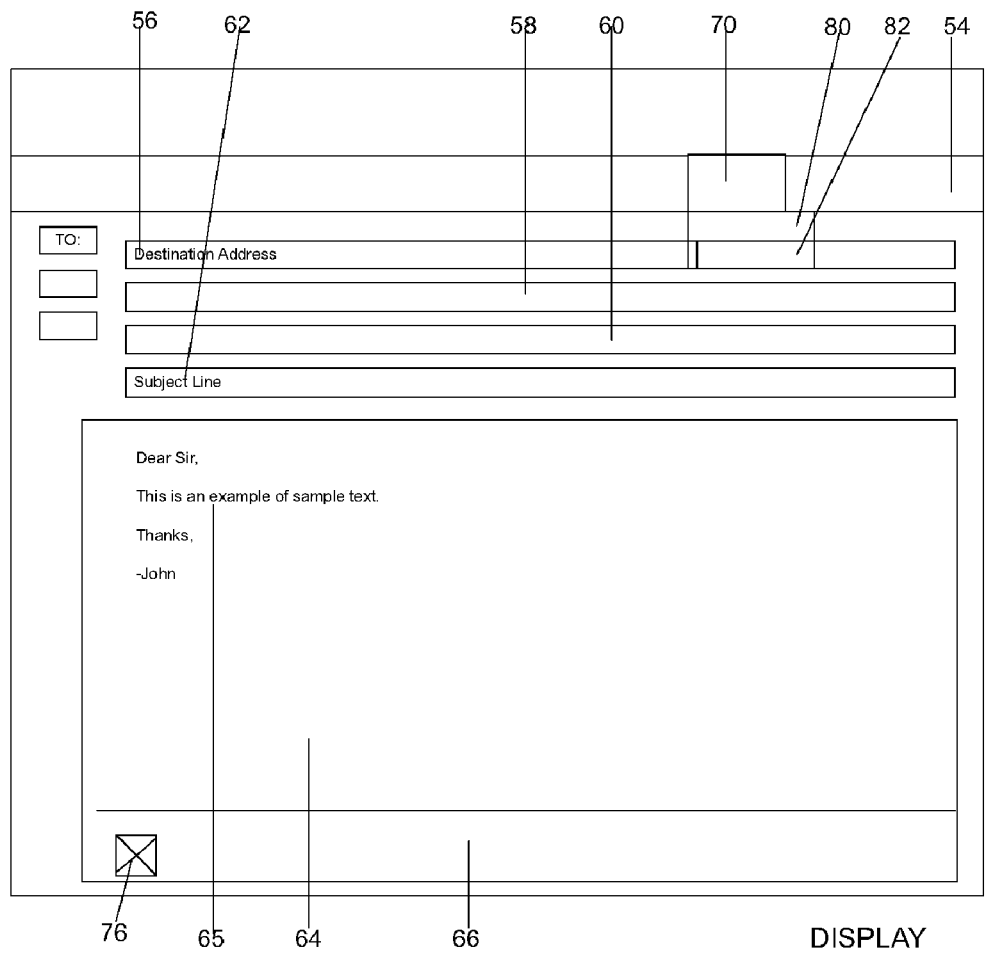
FIG. 4 shows a typical data entry screen for a commercial e-mail application showing our invention installed and the drop-down menu.

Referring to FIG. 4, a second software application is provided to create the secure access transmission mode. The secure access transmission mode is initiated upon the biometric verification of the sender and subsequent creation of virtual envelope more fully described below. The second software application may reside on the computer (10) and (24) or it may reside on the server (16) and (22). The second software application cooperates with the first software application so that when the secure access transmission mode is demanded from the second software application command menu, the biometric verification provided by the first software application will be executed. The second software application is preferably the VS MAIL application by VisionSphere Technologies Inc. Once installed on the sender's computer or on all network computers, an icon (70) will appear in the in the tool bar (54) of the email application software. This gives the email sender the option of sending a message using the secure access transmission mode.

To send a message using the secure access transmission mode, the sender will draft a message (65) in the text box (64), identify a recipient (56), identify the subject matter (62) and optionally attach confidential document (76) to the message by placing the document in the footer (66). If the sender wishes to use the secure access transmission mode the sender clicks onto the icon (70) and will be presented with a drop-down menu showing two choices (80) and (82). The first choice (80), adapted for facial biometrics, is to send the message using the face authentication mode. The text in the drop down menu box will read "FACE AUTHENTICATION". The face authentication mode is may be used when both the sender and the recipient are using facial biometrics as the identity verification mode. Alternatively, the sender and recipient may use different biometric identity methods as more fully described below. Once the secure access transmission mode is chosen, the biometric authentication of both the sender and the recipient is required to first create the virtual envelope, send it and then open it. A second option (82) is available for situation when the sender is able to undergo biometric identity verification and create a secure access transmission mode for sending the message by the recipient is does not have the means for biometric verification or the software to open the virtual envelope. In this case, the recipient will be directed by instructions on the virtual envelope to proceed to a third party web side to download a reading program that will allow the recipient to open the envelope and read the messages contained therein. The reading program may be available from the VisionSphere Technology Inc. web site for from some other third party site. If the sender knows that the recipient does not have the necessary software, the second menu option (82), "READER" will be selected.

Figure 4A:
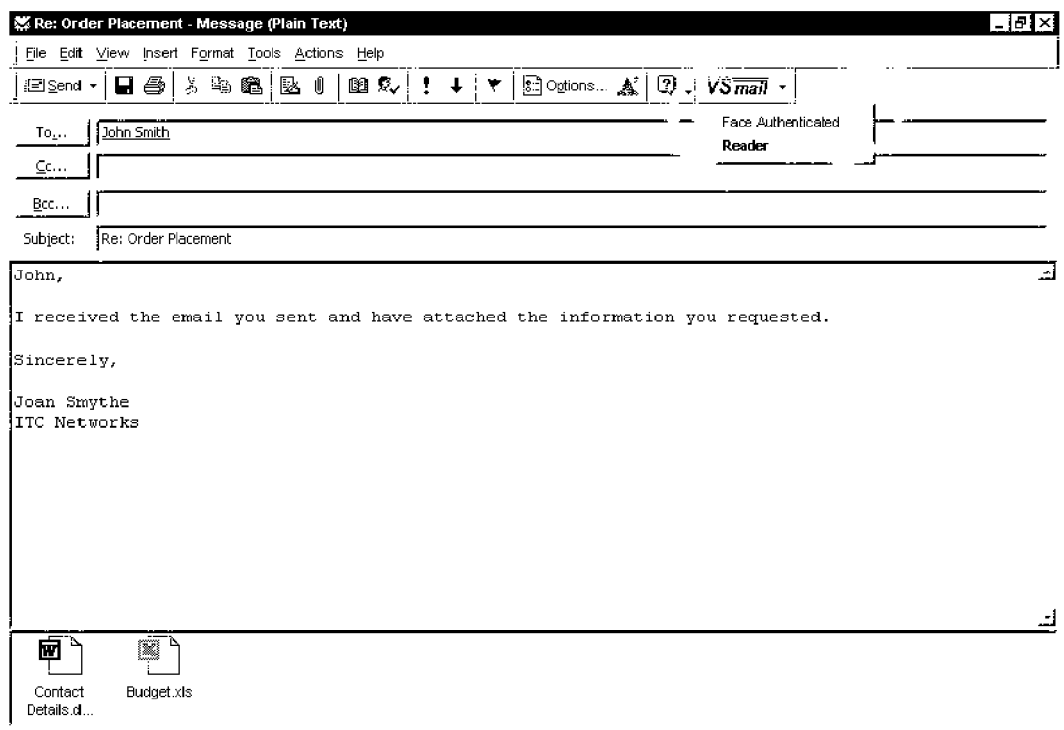
FIG. 4A shows a typical data entry screen for Microsoft™ Outlook™ with our invention installed and the pull-down menu from the VSMAIL™ icon.

The sender may opt not to use the secure access transmission mode and can compose the message and send it in the manner prescribed by the e-mail application. FIG. 4A shows an actual screen from Microsoft™ Outlook™ illustrating the pull-down menu of our invention. As noted above, if facial biometrics is not used, then it is possible to modify our VS MAIL software so that the pull down menu choice (80) would show, for example, FINGERPRINT AUTHENTICATION or IRIS AUTHENTICATION.

Figure 5:
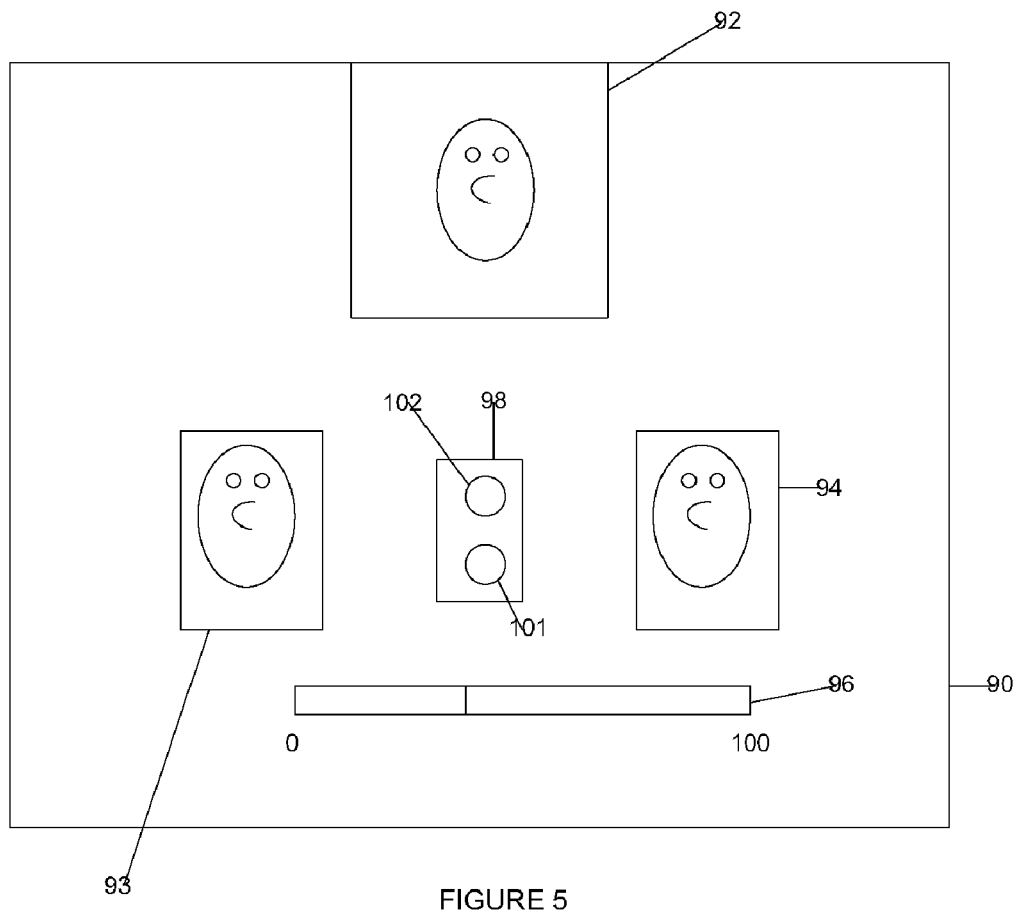
FIG. 5 illustrates the authentication of the sender's facial image of one embodiment of our invention.
Figure 5A:
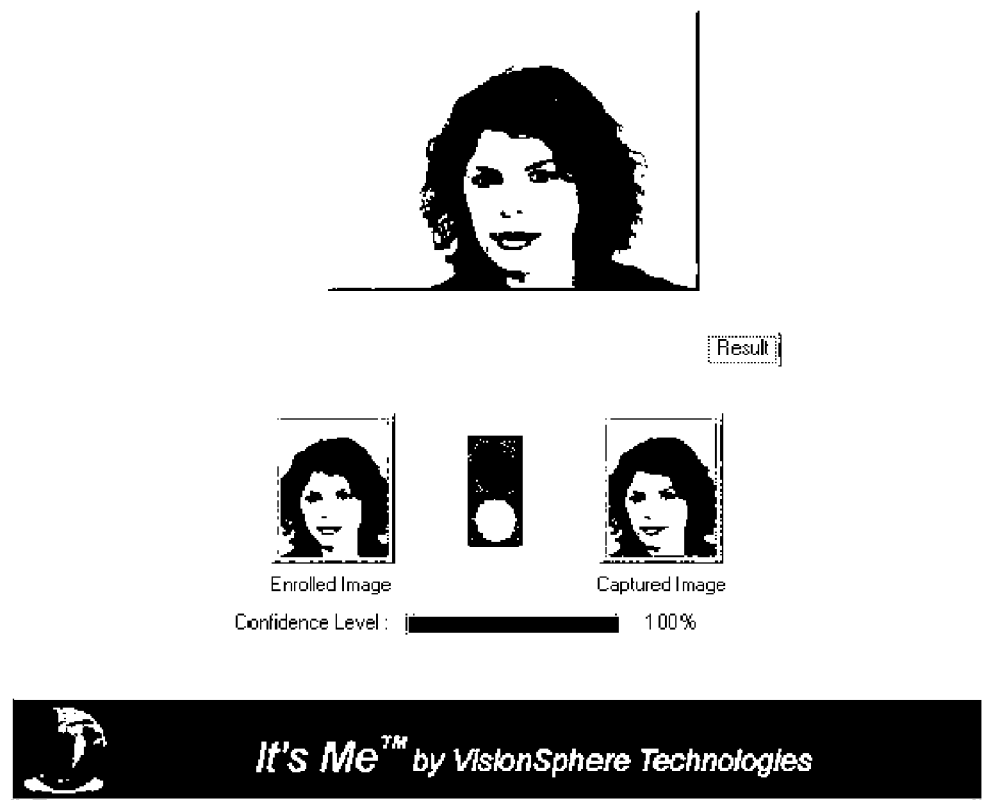
FIG. 5A shows one actual example of a sender's facial image being authenticated by our invention.

Carrying on the example using facial biometrics, the sender will select the "FACE AUTHENTICATION" mode by clicking onto that menu box (80). Once the sender clicks onto box (80) the biometric verification process commence using the biometric verification application (first software application) that has been installed on the computer. Referring to FIG. 2, the sender will generally be seated before the camera (30) of workstation (8). The camera, preferably the VisionSphere Technologies Inc. "IT'S ME" camera, will capture a facial image of the sender and display that image on the screen (90) as shown in FIG. 5. Box (92) will display an image of the users face as captured by camera (30). The same image will appear in box (93). The captured image (92) is transmitted to the processing unit (40) where it is converted into a biometric template unique to the user. The biometric template of the captured image (92) will be compared to the biometric templates of all authorized system users contained in the database (44) using software adapted for that purpose, such as the IT'S ME software. The processing unit will determine the closest match to the captured image and display the stored image (94) as well as the level of confidence of the match (96). The system administrator may pre-set an acceptable level of confidence that must be obtained. With the IT'S ME software, once that confidence level is obtained, an indicator will shown either a green light (101) for a positive match or a red light (102) for a mismatch. In the event of a match, the user will be permitted to send a secure access transmission over the network. In the event of a mismatch the user will be not be able to send or receive messages using the secure access transmission mode. However, even in the event of a mismatch the user will still be allowed to send e-mail using the non-secure access transmission mode of the e-mail application. FIG. 5A shows an actual example of the image verification screen using the IT'S ME software application.

Figure 6:
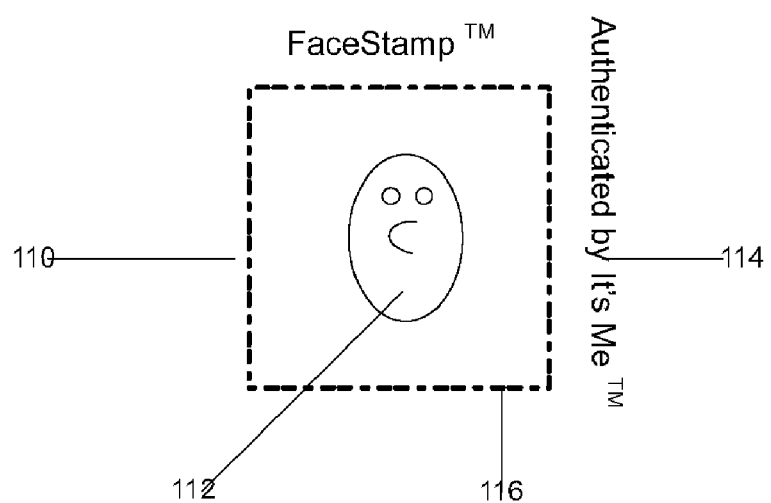
FIG. 6 shows a detailed view of the FACESTAMP of one embodiment of our invention.

Referring to FIG. 6, once the captured image is determined to match the previously stored image of an authorized individual, the second software application, in this case, VS MAIL, will generate authentication icon (110) containing the authenticated image (112) of the individual authorized to use the secure access transmission mode. The mode of authentication of the sender is confirmed by a textual indicator (114). In the example shown, the mode of authentication was the IT'S ME software program. If the human biometric were changed to a fingerprint, then the authentication mode indicator would reflect the name of the fingerprint authentication software used.

Figure 6A:
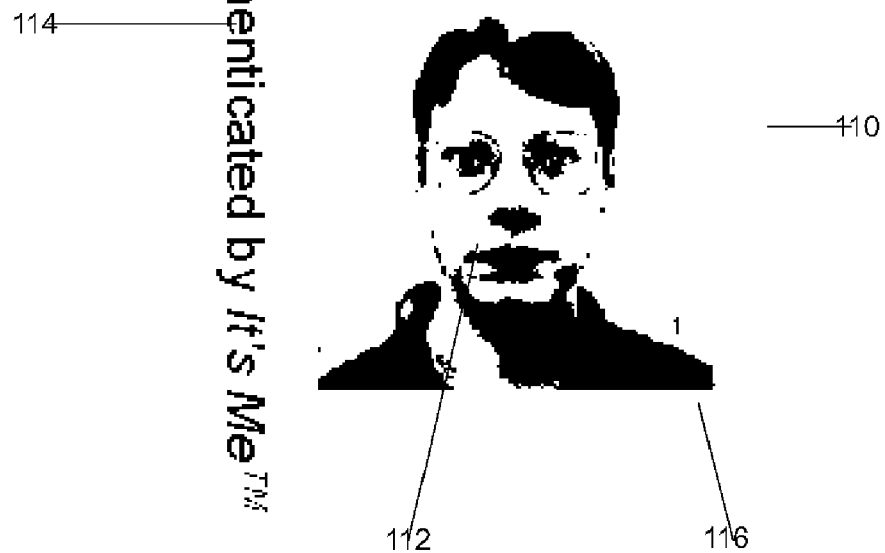
FIG. 6A shows one actual example of a FACESTAMP created by our invention.

The facial image is optionally framed by a postage stamp-type frame (116) to electronically simulate the mailing of a letter. In the example shown, the VS MAIL application software creating the image uses the name FACESTAMP™ to confirm that the identity of the sender has been authenticated by the biometric identity verification software. In this case, the indication is that biometric verification was confirmed by the ITS ME™ software. FIG. 6A shows an actual example of the FACESTAMP™ created by our invention.

In the event that another biometric is used, such as a fingerprint, then a digital image of the face of the sender may be included on the virtual envelope. Such an image would be created, matched to the fingerprint (or handprint or iris scan) and then stored on the database. This gives other biometric verification applications the capability to generate the FACESTAMP used on the virtual envelope described below.

Figure 7:
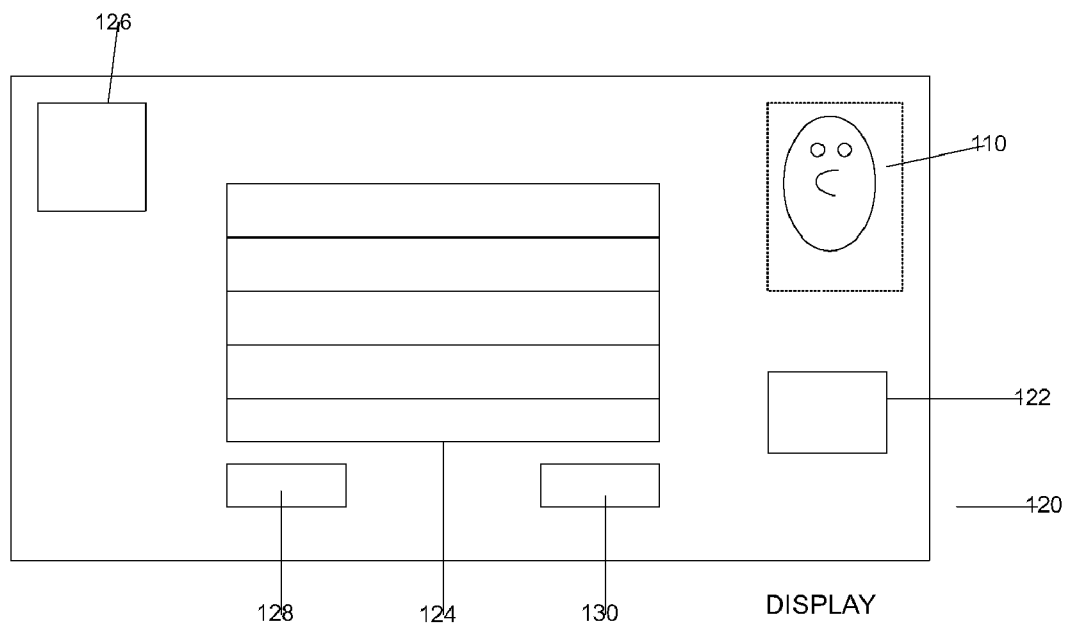
FIG. 7 shows a schematic form of the virtual envelope of one embodiment of our invention.

Referring to FIG. 7, another feature of our invention is the creation and use of a "virtual envelope" or electronic template to graphically assist the sender and recipient in using our invention. The envelope is created by the second software application. Preferably the software application is the VS MAIL software by VisionSphere Technologies Inc. When the sender opts for secure access transmission over the network, the sender will select the VSMAIL icon and then the FACE AUTHENTICATION command (80) from the menu. VSMAIL initiates biometric authentication of the sender using, for example, the IT'S ME application. Once the biometric authentication process is successfully completed, VS MAIL will create the virtual envelope (120) and it will appear on the e-mail screen of the sender. Placed upon the virtual envelope is the authenticated image icon (110) of the sender. The image (110) in this case is a facial image but it may also be a thumbprint image or a handprint image depending on the type of biometric used. The biometric image will also have an invisible digital watermark embedded within it to prevent electronic counterfeiting of the image. Optionally, and in cases where the sender is an employee of a corporation different than that of the recipient, the sender's corporate logo (122) may be placed on the envelope. The envelope contains a plurality of data fields (124) to contain information such as the name of the recipient, the company or organization that the recipient belongs to; the e-mail address of the recipient; the subject of the message; the date that the message was sent and the number of attachments (if any) sent with the message. In the face authentication mode, the identity of the recipient will be authenticated and the authenticated image of the recipient's face (126) will be placed on the envelope. Once the sender clicks onto the SEND button on the e-mail application software, the virtual envelope is electronically sealed and optionally encrypted as further described below.

In another embodiment of our invention, a biometric other than facial may be used. For example, in the case of using a fingerprint biometric, the sender will click on the VSMAIL icon (70) on the email tool bar to create a secure access transmission mode. From the menu, the sender will select biometric verification. As an example, the menu may read PRINT AUTHENTICATION instead of FACE AUTHENTICATION. Biometric verification will take place in the manner dictated by the biometric verification software. Once the biometric verification of the sender is complete, VSMAIL will generate a virtual envelope and it will appear on the monitor as previously described. A confirmed image of the sender's biometric may be placed on the virtual envelope. However, it is preferable to use a facial image of the sender so that the recipient can visually confirm the identity of the sender. Therefore, when the fingerprint verification program completes the authentication of the individual, the fingerprint and an associated facial image of the fingerprint owner would appear on the virtual envelope.

It is clear from the previous discussion that the invention may be used as a software development kit so that it can be integrated with other biometric identity technologies. In this embodiment, the virtual envelope is still be created by our invention however the displayed biometric will whatever biometric is obtained from the biometric technology used.

In another embodiment of our invention it may be used with a combination of human biometric identity authentication methods. For example, the sender may use a fingerprint scanner as described above. The recipient may use a facial biometric also described above. Our invention would permit the sender to authenticate her identity using a different biometric than the recipient. The virtual envelope would display the biometric used and how the individual's identity was confirmed along with a FACESTAMP containing a digital image of the sender and recipient.

Another key innovative feature of our invention comprises the manner in which Public Key Infrastructure (PKI) encryption is used to encrypt the envelope and contents sending it to the recipient. This use of PKI encryption permits the creation of the secure access encrypted transmission mode. This type of PKI encryption is available from software operating systems like Microsoft WINDOWS 2000™. A brief description of PKI is provided below.

There are two main concepts to understand what PKI means. The first concept is the private/public key pair, the second concept is the infrastructure to maintain and distribute public keys. PKI uses the concept of using one key to encrypt data, and an associated key to decrypt the same data. To encrypt a piece of data that only a desired recipient can decrypt you use the recipient's public key that is freely available and distributable to encrypt the data. You would then send the public key encrypted data to the recipient. The recipient uses his private key that is only known to the recipient to decrypt the message.

For example, when sender wishes to send an encrypted message to recipient, she looks up recipient's public key in a public directory, uses it to encrypt the message and sends it to recipient. Recipient then uses his private key to decrypt the message and read it. No one intercepting the message is able to decrypt it without recipient's private key.

Using a PKI allows the sender to "digitally sign" a message. Therefore, the sender could place his digital signature on the virtual envelope generated by VSMAIL as a further method of sender identity authentication. The digital signature is created by the encryption application using the sender's unique private key and the data contained in the message itself. The output is called a digital signature and is attached to the message.

To verify the sender's digital signature, recipient does a computation involving the message, the sender's digital signature and the sender's public key. The sender's public key is available to recipient. If the anticipated result is achieved, the recipient will be notified that the signature is genuine. If the digital signal is not indicated as genuine then the recipient may suspect that the digital signature is fraudulent or that the message may have been altered. It is possible for the private key to be compromised and in such an event it is necessary to obtain a new one from the encryption program provider.

One advantage of our invention is that the application of the sender's or recipient's private key can be made to happen only after a biometric confirmation of the individual's identity. Therefore, neither the sender nor recipient need be concerned about remembering or securing their respective private keys. Once biometric identity confirmation is complete, the private key is automatically applied to the message for decryption.

Another aspect of using PKI is the existence of Certificate Authorities, or CA's who issue "certificates" and guarantees their authenticity. A certificate is data that contains an encryption key and the certificate holder's identity. Two well know CAs are Entrust and Verisign. The CA is also able to revoke and reissue a certificate if the private key has been compromised.

In one embodiment of our invention, Public/Private key pairs are provided to the recipients and senders. Third party CAs are not used. In this embodiment of the invention, the VSMAIL application will maintains its own list of public keys and these will be made available to other VSMAIL users. Therefore, when a message is send from one VSMAIL user to another VSMAIL user, the public key is transmitted with it. The key is secured through the necessity for biometric identity verification before access to the key is permitted. Once the recipient has the sender's public key, the recipient will be able to verify the digital signature of the sender. The recipient is also able to send the sender recipient's public key to facility future secure message traffic between the two sites.

In another embodiment of our invention CAs are used to provide the public and private encryption keys. The required certificates are obtained from the CA and integrated into the VSMAIL software application. Therefore, the software may be sold as, for example, ENTRUST compatible or Versign compatible.

In yet another application of our invention, the software is able to interface with a plurality of other biometric devices utilizing the industry standard BioAPI 1.1.

Therefore, the secure access encrypted mode of transmission may take a plurality of forms in our invention. However, whatever form is used, our invention permits encryption to occur automatically once the identity of the sender is confirmed.

Figure 7A:
FIG. 7A shows an actual virtual envelope created by our invention following authentication of the sender's image.

In yet another embodiment of the invention, and to facilitate document tracking by the sender, a document tracking number may be attached to the envelope and all message attachments. As a further option, a copy of the transmitted document may be sent to a secure storage site at the sender's location for archival and retrieval purposes. FIG. 7A is an actual example of a virtual envelope created by our invention.

Figure 8:
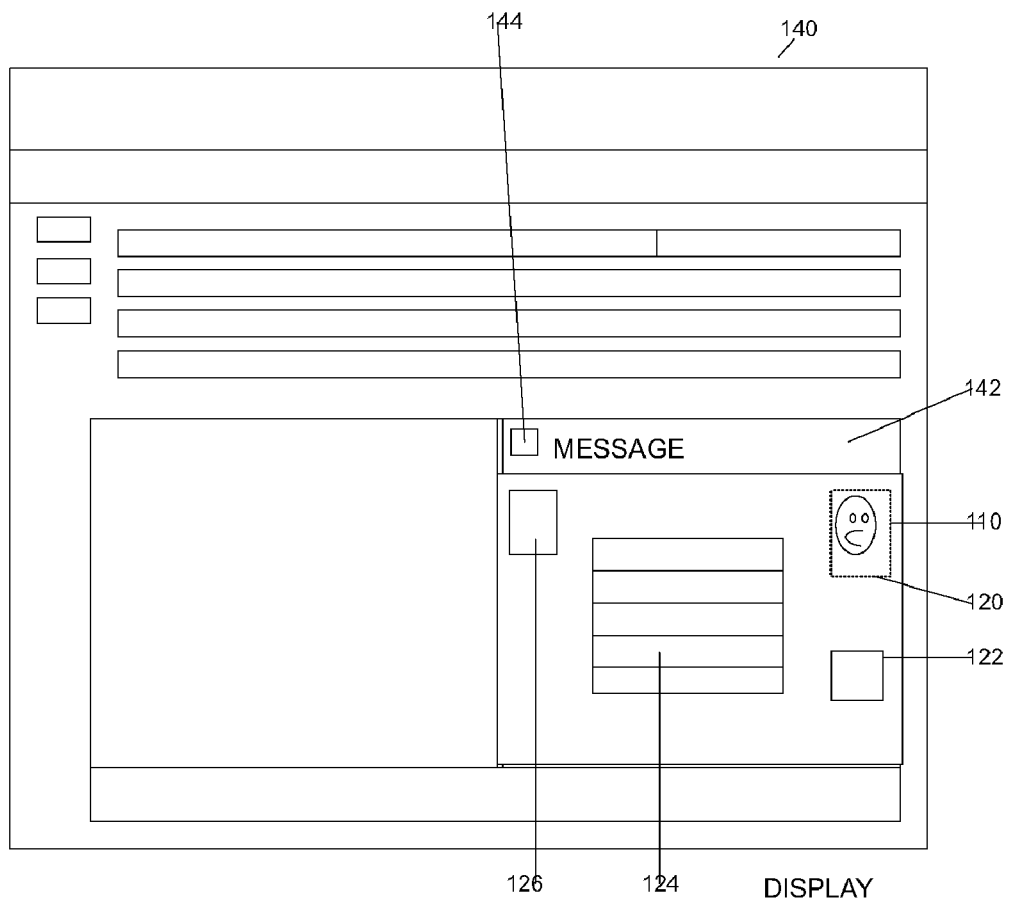
FIG. 8 shows the location of the virtual envelope in the recipient's e-mail application incoming messages screen.
Figure 8A:
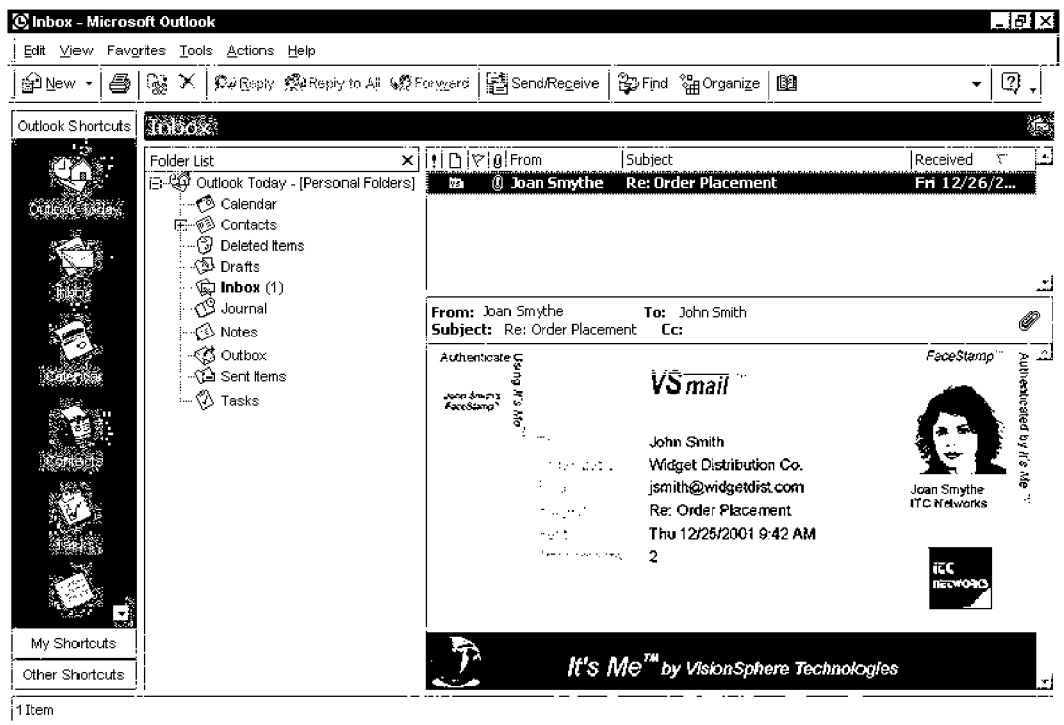
FIG. 8A shows an actual example of a virtual envelop in the recipients in-box using Microsoft™ Outlook™.

Referring to FIG. 8, when the recipient receives the message, the virtual envelope (120) will appear in the recipient's e-mail inbox window (140) below the message-waiting bar (142). As well, an icon (144) will appear in front of the message-waiting bar (142) to indicate that the message has been secured using our invention. The recipient will be able to immediately identify the sender by the FACESTAMP (110) attached to the envelope and the sender's corporate logo (122). Data fields (124) will give the recipient the information as described above. Position (126) on the envelope remains blank until the recipient authenticates her identity. To do this, the recipient will click onto the message bar (142) and the biometric confirmation process will commence as previously described and with reference to FIG. 5. Once the recipient's identity is authenticated the recipient's image will appear at position (126). The message cannot be opened until the recipient's identity is confirmed. Once the recipient's facial image has been authenticated the image will appear in position (126) on the virtual envelope and the recipient will be able to open the mail message and any attachments. A counterfeit envelope may be detected by the absence of the digital watermark on the sender's image. A counterfeit envelope cannot be opened. FIG. 8A is an actual example of our virtual envelope in the recipient's inbox using Microsoft™ Outlook™.

Figure 9:
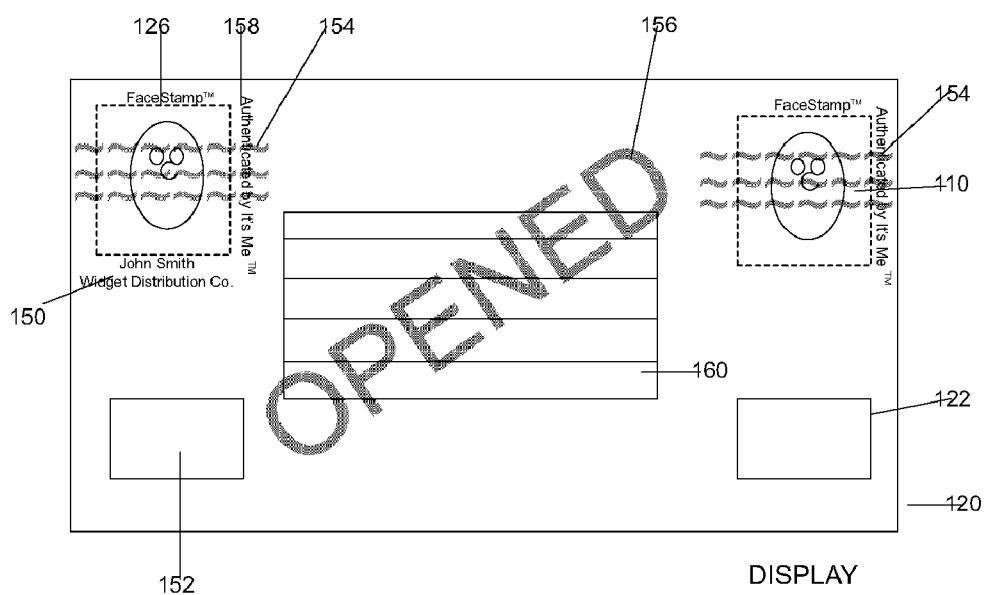
FIG. 9 shows the use of authenticated images of sender and recipient with watermarks to prevent copying and reusing of the virtual envelope.
Figure 9A:
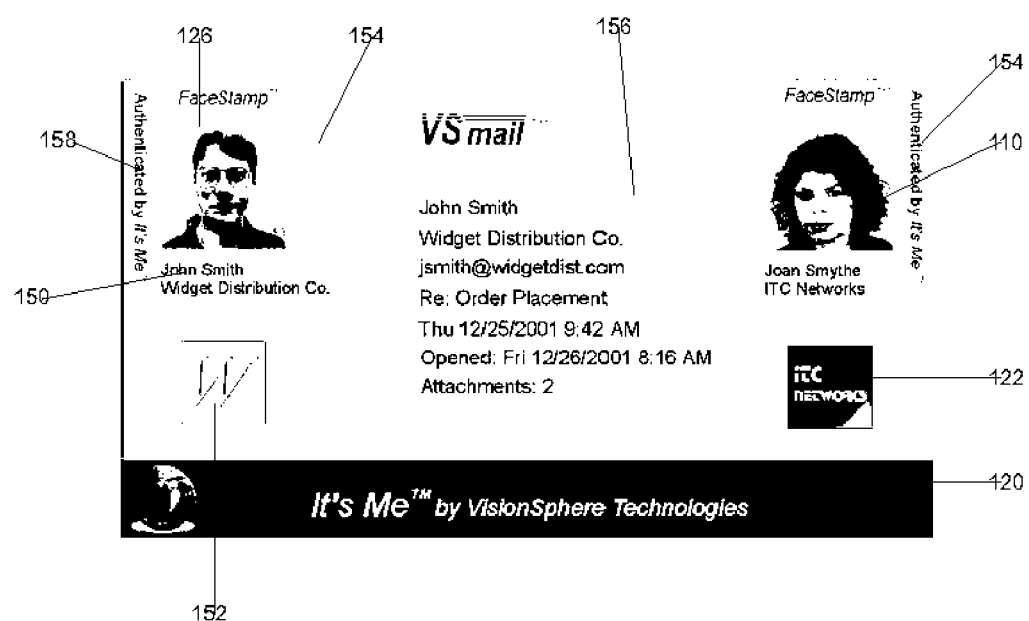
FIG. 9A shows an actual example of the cancelled virtual envelope.

Referring to FIG. 9, once the recipient's identity has been confirmed, virtual envelope (120) will display the recipient's facial image (126) in the position reserved for the recipient's authenticated facial image. The name of the recipient (150) will be displayed as will the recipient's corporate logo (152) if the recipient is employed by a company other than that of the sender. To further confirm the authentication of the recipient; the fact that the secured message has been successfully opened; and, to prevent reuse of the virtual envelope once it has been opened by the recipient, visible watermarks (154) will be placed over the image of the recipient (126) and sender (110). An additional visible watermark (156) will appear on the face of the virtual envelope indicating that envelope has been opened. A textual message (158) will appear adjacent to the recipient's authenticated image indicating mode of authentication. The opened virtual envelope will further display a data field (160) containing the date and time when the envelope was opened. To further prevent reuse or counterfeiting of the virtual envelope and facial images an invisible digital watermark will be placed within the recipient's and senders displayed image indicating that the envelope has been opened. To confirm receipt of the message, an identical copy of the opened virtual envelope as shown in FIG. 9 will be sent back to the sender by returned e-mail. FIG. 9A is an actual example of an opened virtual envelope of our invention that would be returned to the sender as confirmation of receipt.

Figure 10:
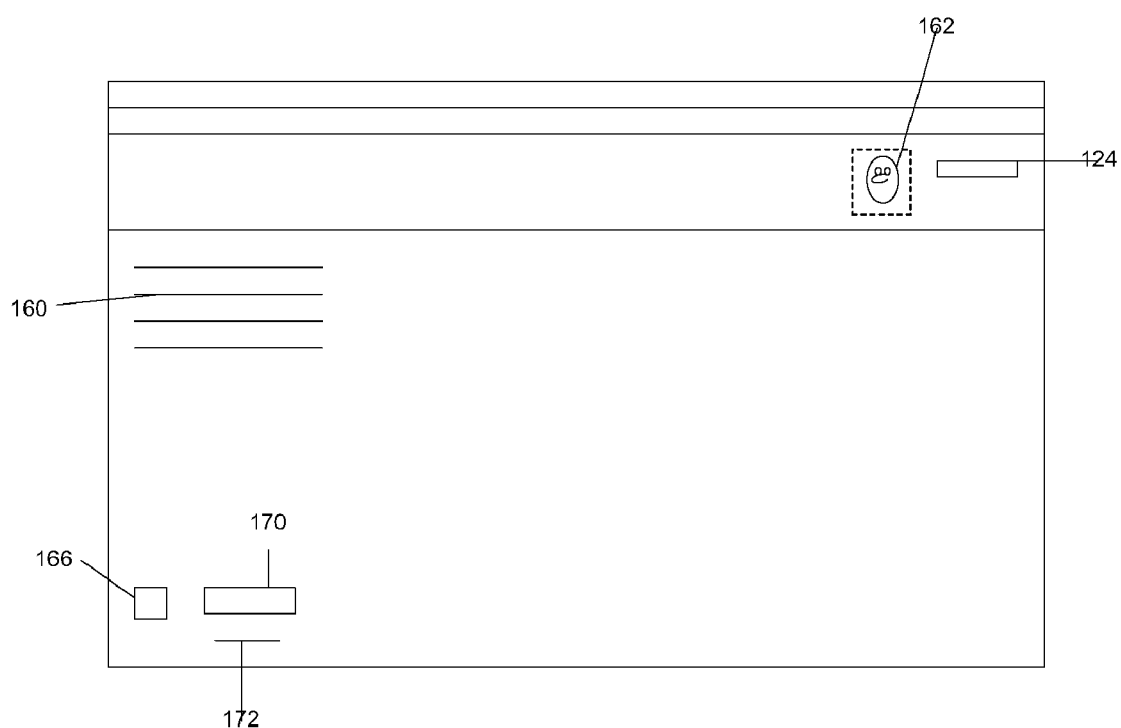
FIG. 10 shows an opened message in the recipients e-mail application.
Figure 10A:
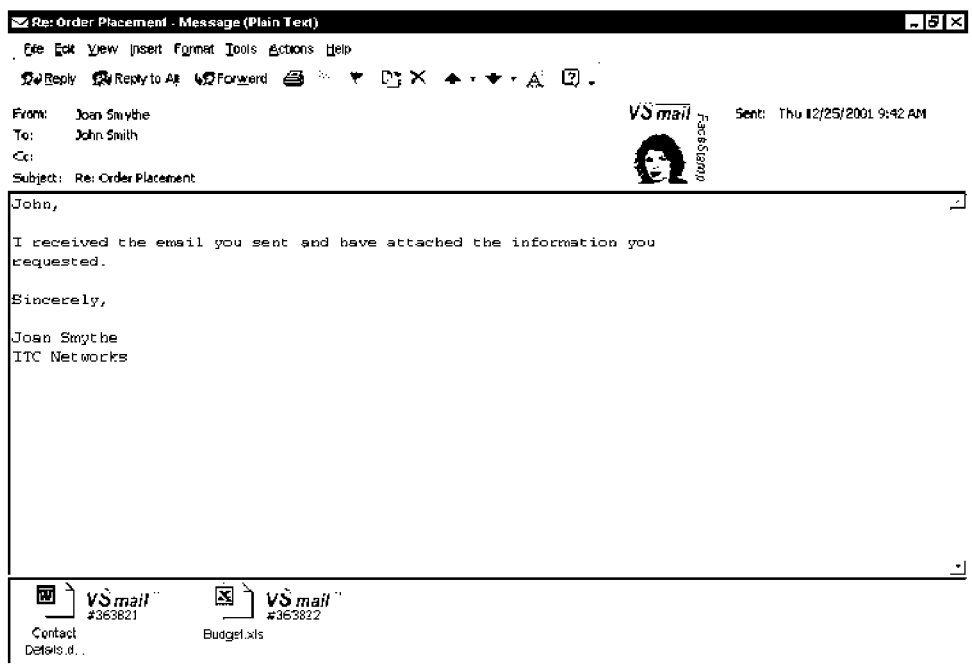
FIG. 10A shows an example of an opened message using our invention in Microsoft™ Outlook™.

Referring to FIG. 10, the opened secure message (160) will be displayed by in a format dictated by the e-mail application used. The watermarked image (162) of the sender will be displayed on the opened message as well as the time and date the message was sent (164). The message attachment icon (166) will display a secure attachment icon (170) and the tracking number (172) related to each attachment. In order to open the attachments, the recipient clicks on the attachment icons and the message will open in a predetermined format. In another embodiment of our invention, each attachment will require further recipient verification before it will open. In a further embodiment our invention the attachments may be encrypted by encryption means. FIG. 10A is an actual example of the recipient's opened mail after recipient authentication using Microsoft™ Outlook™.

Figure 11:
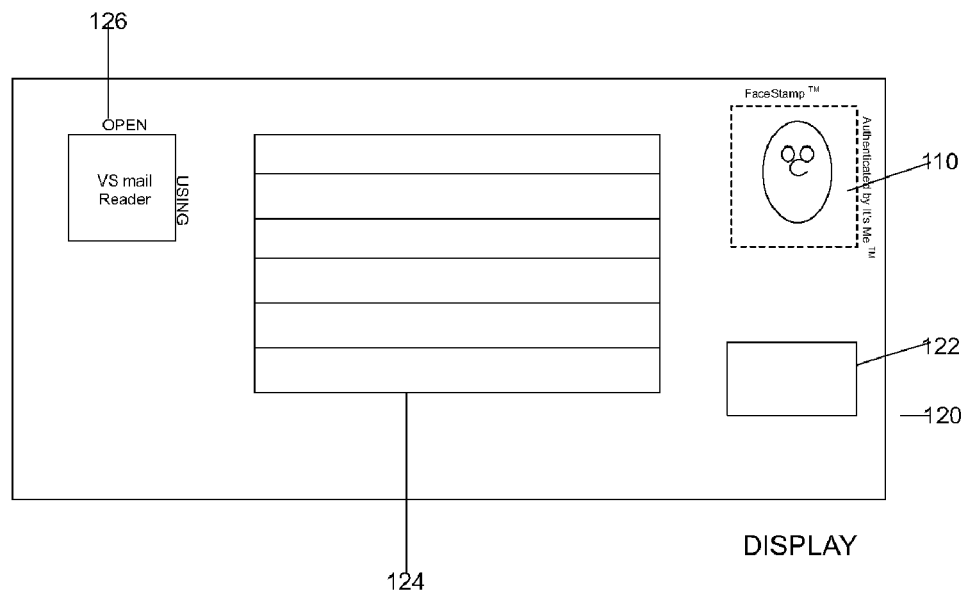
FIG. 11 shows one embodiment of our invention where only the recipient's identity can be authenticated.
Figure 11A:
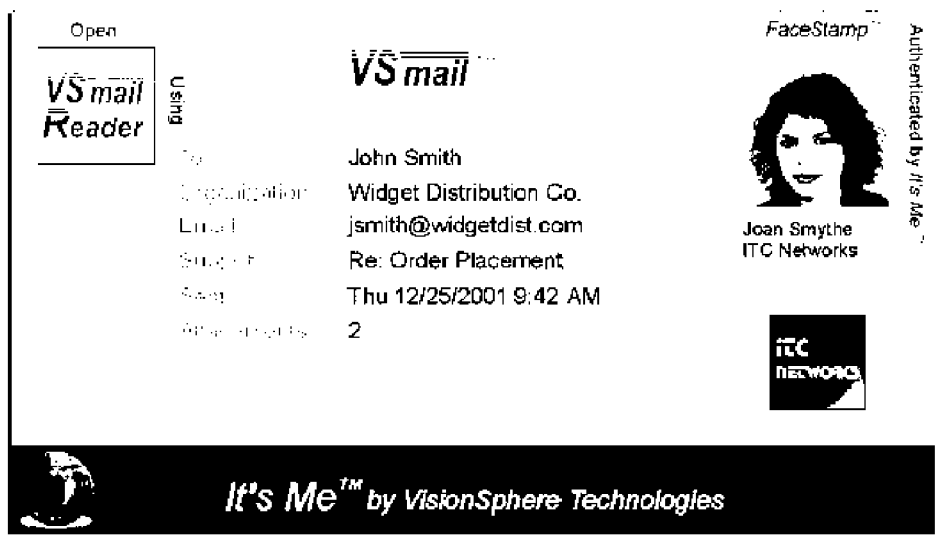
FIG. 11A shows an actual example of one embodiment of our invention where only the sender may be authenticated.

In another embodiment of our invention, only the sender will have our invention installed. Sender's computer will have a digital video camera attached to it. Referring to FIG. 4, if the sender chooses to send the message using our invention, then the sender will click on icon (70) and selects the READER (82) item from the drop down menu. The sender will follow the same process as previously described and send the message. However, since recipient does not have our invention installed on her computer she will not be able to read the message. To resolve this problem, the recipient will receive the message as previously described with the envelope (120). However, at position (126) there will be a message to recipient to obtain a copy of the reader program from VisionSphere Technology Inc's website or a third party website. This program may be downloaded from the sender's server or it may download from a third party site. The recipient will click onto position (126) in order to obtain the reader program. Once the program is downloaded the recipient will be able to open and read the message. However, recipient's authentication will not be possible. Referring to FIG. 11A there is shown an actual example of a virtual envelope wherein only the sender has been authenticated.

Figure 12:
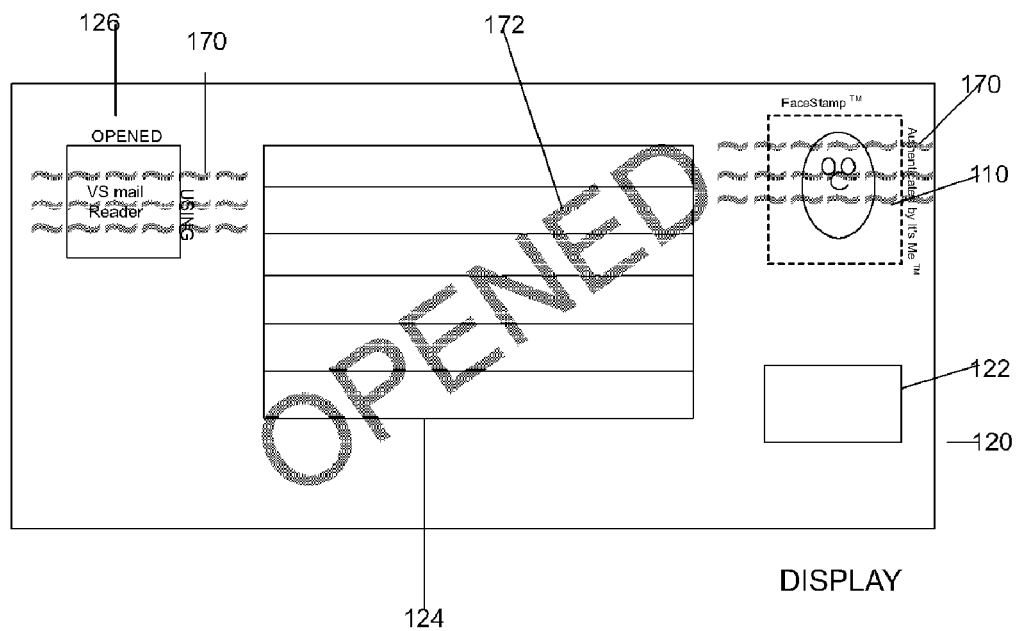
FIG. 12 shows an opened virtual envelope returned to the sender in one embodiment of our invention.
Figure 12A:
FIG. 12A shows an actual example of an opened virtual enveloped where only the sender is authenticated.

Referring to FIG. 12, once the reader has confirmed that the envelope is authentic, visible watermarks (170) will be placed on the virtual envelope (120) as well as an indication that the virtual envelope has been opened (172). A copy of the opened virtual envelope is returned to the sender. The data field (124) will contain an entry of the date and time the message was opened. FIG. 12A shows an actual opened envelope by our invention.

Although the description above contains much specificity, these should not be construed as limiting the scope of the invention but as merely providing illustrations of some of the presently preferred embodiments of this invention. Thus the scope of the invention should be determined by the appended claims and their legal equivalents rather than by the examples given.

What is claimed is:

1. A system for transmitting secure data between a sender and a recipient over a computer network using a virtual envelope, said system comprising:
   a. a sender work station comprising a first computer connected to a first keyboard, a first monitor, sender biometric capture means, a first software program residing in said first computer for converting said sender biometric into a sender biometric template, a first server connected to said computer network, said first server comprising a first database of biometric templates of authorized senders and a second software program residing in said first server for authenticating the identity of said sender by comparing said sender biometric template with said first database of biometric templates of authorized senders, displaying an image of the biometric of the closest match on said first monitor and displaying the confidence level of said closest match on the first monitor;
   b. a recipient work station in communication with said first sender work station over the computer network, said recipient work station comprising a second computer connected to a second keyboard, second monitor and recipient biometric capture means, said first software program residing on said second computer for converting said recipient biometric into a recipient biometric template, a second server connected to the computer network, said second server comprising a second database of biometric templates of authorized recipients and said second software program residing on the second server for authenticating the identity of said recipient by comparing said recipient biometric template with said database of biometric templates of authorized recipients, displaying an image of the biometric of the closest match on said second monitor and displaying the confidence level of said closest match on the second monitor;
   c. a visible authentication icon adapted to confirm the identity of the sender and of the recipient as authorized sender and recipient respectively, wherein said authentication icon displays an image of the biometric of the authorized sender and recipient respectively, and wherein the authentication icon is generated by the second software application, and further wherein the sender and recipient are granted access to the system only upon generation of their respective authentication icons;
   d. an invisible digital watermark embedded in said image of the biometric to prevent electronic counterfeiting, wherein said invisible digital water mark is generated by the second software application; and,
   e. a visible virtual envelope to which said secure data to be sent over the computer network is attached, wherein said visible virtual envelope is created, electronically sealed and sent from said sender workstation only upon authentication of the identity of the authorized sender otherwise not created and opened electronically at said recipient workstation only upon the authentication of the identity of the authorized recipient otherwise not opened, and wherein the visible virtual envelope is created by the second software application; and further wherein the visible virtual envelope is marked with the visible authentication icon of the sender prior to being sent so that the recipient knows the sender is an authorized sender, and wherein the visible virtual envelope is marked with the visible authentication icon of the recipient prior to being returned to the sender so that the sender knows the recipient was an authorized recipient.

2. The system as claimed in claim 1 wherein the image of the biometric of the authorized sender arid recipient is a facial image.

3. The system as claimed in claim 1 wherein the visible virtual envelope is encrypted automatically using encryption means only upon authentication of the sender as an authorized sender and decrypted automatically using decryption means only upon authentication of the recipient as an authorized recipient.

4. The system as claimed in claim 3 in which the visible virtual envelope and the secure data attached thereto are encrypted separately.

5. The system as claimed in claim 3 wherein said encryption means and said decryption means are based upon public key infrastructure encryption and decryption.

6. The system as claimed in claim 1 wherein the visible virtual envelope displays the following data fields at the sender's work station prior to sending to the recipient:
   a. the authentication icon of the authorized sender;
   b. the name of the sender;
   c. the name of the recipient;
   d. the e-mail address of the recipient;
   e. a subject line;
   f. a document tracking number;
   g. the date the message was sent; and,
   h. an indication of the number of attachments with the message.

7. The system as claimed in claim 6 wherein the visible virtual envelope displays the following information at the recipient's work station:
   a. the authentication icon of the authorized sender and authorized recipient;
   b. the date and time the envelope was opened;
   c. a visible watermark over the virtual envelope so that the virtual envelope cannot be copied and reused; and,
   d. a visible water mark over the authentication icons of the authorized sender and the authorized recipient so that the icons cannot be copied and reused.

8. The system as claimed in claim 7 wherein the visible virtual envelope is returned automatically to the authorized sender once it is opened by the authorized recipient.

9. The system as claimed in claim 1, wherein the sender is an authorized sender and the recipient is an unauthorized recipient, and wherein said unauthorized recipient may open the visible virtual envelope and access the secure data contained therein without biometric authentication of the recipient's identity by using an authorized software program permitting access to the secure data without authentication of the recipient's identity.

10. A method for creating a system for transmitting secure data over a computer network using biometric templates for authenticating the identity of a sender as an authorized sender of said secure data and a recipient as an authorized recipient of the secure data, said method comprising the steps of:
   a. providing a sender work station comprising a first computer connected to a first keyboard and a first monitor, wherein said first computer is in communication with a first server, and wherein said first server is in communication with said computer network;
   b. providing a recipient work station comprising a second computer connected to a second keyboard and a second monitor, wherein said second computer is in communication with a second server, and wherein said second server is in communication with the computer network;
   c. selecting a biometric for authenticating the identity of said sender and said recipient;
   d. obtaining said biometric from all authorized senders and authorized recipients and creating a database of biometrics of all authorized senders and authorized recipients;
   e. converting said database of biometrics into a database of biometric templates;
   f. storing said database of biometric templates in said first and said second servers;
   g. providing biometric capture means for capturing the biometric of the sender and recipient and attaching said biometric capture means to said first and said second computers;
   h. providing a first software application for converting said sender and said recipient biometric into a sender and recipient biometric template, wherein said first software application resides within the first and second computers; and,
   i. providing a second software application for comparing said sender and recipient biometric template with the database of biometric templates, wherein said second software application is adapted to match the sender and recipient biometric templates with the biometric template of an authorized sender and authorized recipient respectively within a predetermined confidence interval, and wherein the second software application resides within the first and second servers, and further wherein the second software application is further adapted to generate a virtual envelope for containing and transmitting said secure data over the computer network only upon the authentication of the identity of the sender as an authorized sender, and wherein the second software application permits opening of the virtual envelope by the recipient only upon authentication of the recipient as an authorized recipient.

11. A method using biometric templates for transmitting secure data over a computer network between a sender using a first networked computer at a first workstation and a recipient using a second networked at a second workstation wherein authentication of the identity of said sender as an authorized sender is a condition precedent to transmission of said secure data, and further wherein authentication of the identity of said recipient as an authorized recipient is a condition precedent to accessing the secure data, said method comprising the following steps:
   a. a step for authenticating the identity of the sender as an authorized sender;
   b. a step for creating a visible virtual envelope for attaching the secure data thereto, wherein said visible virtual envelope may be opened only by an authorized recipient;
   c. a step for sealing and sending the visible virtual envelope to the recipient;
   d. a step for authenticating the identity of the recipient as an authorized recipient; and, e. a step for opening the visible virtual envelope to gain access to the secure data attached thereto.

12. The method of claim 11 further comprising a step for encrypting said visible virtual envelope by encryption means after said step for authenticating the identity of said sender.

13. The method of claim 12 further comprising a step for decrypting the visible virtual envelope by decryption means after said step for authenticating the identity of the recipient.

14. The method of claim 11, wherein said step for authenticating the identity of the sender as an authorized sender comprises the steps of:
   a. obtaining a predetermined biometric of the sender using biometric capture means;
   b. converting said predetermined biometric into a biometric template using a first software application;
   c. comparing said biometric template with a database of biometric templates representative of all authorized senders using a second software application;
   d. confirming that the biometric template of the sender is contained within the database of biometric templates of authorized senders within a predetermined confidence interval using said second software application; and,
   e. creating an authentication icon displaying the predetermined biometric of the sender using the second software application, wherein said authentication icon includes an invisible digital watermark to prevent copying thereof.

15. The method of claim 14, wherein said step for creating the visible virtual envelope includes the electronic attachment of the secure data thereto and displaying said authentication icon thereupon.

16. The method of claim 15 wherein the step for creating the visible virtual envelope further includes placing upon the virtual envelope the name and electronic address of the recipient, a subject line, the date and time the envelope was transmitted and the number of attachments included.

17. The method of claim 16 wherein said step for authenticating the identity of the recipient as an authorized recipient comprises the steps of:
   a. obtaining the predetermined biometric of the recipient using said biometric capture means;
   b. converting the predetermined biometric into a biometric template using the first software application;
   c. comparing said biometric template with a database of biometric templates representative of all authorized recipients using the second software application;
   d. confirming that the biometric template of the recipient is contained within the database of biometric templates of authorized recipients within said predetermined confidence interval using the second software application; and,
   e. creating an authentication icon displaying the predetermined biometric of the recipient using the second software application, wherein said authentication icon includes an invisible digital watermark to prevent copying thereof.

18. The method of claim 17 wherein said step for opening the visible virtual envelope includes the step of placing said authentication icon displaying the predetermined biometric of the authorized recipient on the visible virtual envelope and automatically sending a copy of the opened visible virtual envelope to the authorized sender.

19. The method of claim 18 wherein the step of opening the visible virtual envelope further includes the step of placing visible watermarks on the visible virtual envelope to signify that visible virtual envelope been opened by the authorized recipient and to prevent copying of the visible virtual envelope.

20. The method of claim 19 wherein said visible watermarks take the form of a plurality of wavy lines superimposed over the authentication icon displaying the predetermined biometric of the authorized sender and the authorized recipient.

21. The method as claimed in claim 20 wherein the watermarks further include the visible word "opened" placed across the visible virtual envelope.

22. In a computer network comprising a plurality of computers wherein said network further comprises a sender's secure access computer and a recipient's non-secure access computer, a method using biometrics to create a secure access transmission mode between said sender's secure access computer and said recipient's non-secure access computer, said method comprising the following steps executable at the sender's computer:
   a. creating a message for transmission over the network;
   b. selecting said secure access transmission mode;
   c. confirming by biometric means the identity of the sender as an individual authorized secure access to the network;
   d. attaching said message to an electronic template having a plurality of data fields for placing a plurality of information therein to be transmitted with said message;
   e. populating said data fields with:
      i. an image of the authenticated sender's biometric;
      ii. an image of the sender's corporate logo;
      iii. the name of the sender;
      iv. the name of the recipient;
      v. electronic address of the recipient;
      vi. the subject of the message;
      vii. the date and time the message was sent;
      viii. the number of files attached to the message;
      ix. instructions to obtain message reading means so that the recipient is directed to a location on the network where the recipient can obtain a software program permitting access to the message without recipient identity authentication;
   f. sealing said electronic template;
   g. transmitting the electronic template to the recipient computer;
   h. receiving the template at the recipient computer;
   i. alerting the recipient as to the receipt of a secured message;
   j. directing the recipient to follow said instructions;
   k. downloading said software program;
   l. opening the template using the software and accessing the messages contained therein;
   m. placing a confirming message to the sender on the template stating that the message has been opened by the recipient using the software;
   n. placing visible watermarks on the authenticated sender's biometric image and the template indicating that the message has been opened; and,
   o. transmitting a copy of the opened template to the sender.

* * * * *